(12) United States Patent
Paul et al.

(10) Patent No.: US 7,305,233 B2
(45) Date of Patent: Dec. 4, 2007

(54) METHOD AND APPARATUS FOR IMAGE DISTRIBUTION USING A CELLULAR PHONE

(75) Inventors: Glenn Paul, Titusville, NJ (US); Joseph Godcharles, Lawrenceville, NJ (US)

(73) Assignee: Exclaim, Inc., West Trenton, NJ (US)

( * ) Notice: Subject to any disclaimer, the term of this patent is extended or adjusted under 35 U.S.C. 154(b) by 13 days.

(21) Appl. No.: 11/139,948

(22) Filed: May 27, 2005

(65) Prior Publication Data

US 2005/0266839 A1 Dec. 1, 2005

Related U.S. Application Data

(60) Provisional application No. 60/574,796, filed on May 27, 2004.

(51) Int. Cl.
*Q04M 3/00* (2006.01)
(52) U.S. Cl. .................... 455/418; 455/414.1; 348/376
(58) Field of Classification Search ................ 455/418, 455/557, 414.1; 348/376, 220.1
See application file for complete search history.

(56) References Cited

U.S. PATENT DOCUMENTS

| | | | | |
|---|---|---|---|---|
| 4,698,672 A | 10/1987 | Chen et al. | ................ | 358/136 |
| 6,321,231 B1 | 11/2001 | Jebens et al. | ................ | 707/104 |
| 6,332,146 B1 | 12/2001 | Jebens et al. | | |
| D487,103 S | 2/2004 | Chin | | |
| 6,701,845 B2* | 3/2004 | Ohmura | ................ | 101/484 |
| 6,909,889 B2* | 6/2005 | Ishikawa | ................ | 455/414.1 |
| 7,016,059 B1* | 3/2006 | Baum et al. | ................ | 358/1.15 |
| 7,023,575 B1* | 4/2006 | Ichihara | ................ | 358/1.17 |
| 7,024,230 B2* | 4/2006 | Curtiss et al. | ................ | 455/569.1 |
| 7,031,745 B2* | 4/2006 | Shen | ................ | 455/550.1 |
| 7,173,651 B1 | 2/2007 | Knowles | ................ | 348/207 |
| 2003/0174357 A1* | 9/2003 | Lester et al. | ................ | 358/1.15 |
| 2003/0217194 A1* | 11/2003 | Kazumi et al. | ................ | 709/321 |
| 2004/0159255 A1* | 8/2004 | Ohmura | ................ | 101/484 |
| 2005/0021571 A1 | 1/2005 | East | ................ | 707/201 |
| 2005/0108185 A1 | 5/2005 | East et al. | ................ | 701/1 |
| 2005/0108289 A1 | 5/2005 | East et al. | ................ | 707/200 |
| 2005/0162687 A1* | 7/2005 | Lee | ................ | 358/1.15 |
| 2006/0171523 A1 | 8/2006 | Greenwell | ................ | 379/242 |

FOREIGN PATENT DOCUMENTS

| GB | 2 406 189 A | 3/2005 | .................... 17/30 |
|---|---|---|---|
| WO | WO 2006/125961 A1 | 11/2006 | .................... 1/32 |

* cited by examiner

*Primary Examiner*—Charles N. Appiah
*Assistant Examiner*—Nghi H. Ly
(74) *Attorney, Agent, or Firm*—Synnestvedt & Lechner LLP

(57) ABSTRACT

A method and apparatus for controlling the distribution, including printing, of digital images using a wireless enhanced, digital imaging device, such as a cellular phone equipped with a digital camera. A picture created using the digital camera is uploaded to a remote server. Arrival of the digital image, activates the automatic printing and automatic delivery of that image, according to instructions placed on the server by the creator of the digital image, prior to its creation. Information attached to the digital image may be used to route and process the uploaded image, in accordance with a set of predetermined user preferences. The single action of sending a digital image to a web address from a cellular phone may cause the image to be stored, printed and delivered as a print to an address, with the printing and mail delivery being automatically charged to an account or credit card.

17 Claims, 3 Drawing Sheets

METHOD AND APPARATUS FOR IMAGE DISTRIBUTION USING A CELLULAR PHONE

CROSS REFERENCE TO RELATED APPLICATIONS

This application is related to, and claims priority from, U.S. Provisional Patent application No. 60/574,796 on May 27, 2004, by Joseph Godcharles and Glen Paul entitled "Method and Apparatus for Image Distribution using a Cellular Phone", the contents of which are hereby incorporated by reference in their entirety.

FIELD OF THE INVENTION

The present invention relates to the field of digital photography, and particularly to the printing and distribution of digital images taken by a digital imaging device.

BACKGROUND OF THE INVENTION

Cellular phones combined with digital cameras are consumer electronic devices that combine two well known technologies into a single device that allows a user to take digital pictures and relay the pictures to remote locations. A typical cellular phone combined with a digital camera is detailed in, for instance US Design Patent D478,103, titled "Digital Camera for Cellular Phone", granted to Chin on Feb. 24th, 2004, the contents of which are hereby incorporated by reference.

Although a combined digital camera and cellular phone makes it easier for a user to take pictures, the limited screen size and memory of current cellular phones create the need for new ways to manage and view the images. One way for users of combined cellular phone and digital cameras to manage their images is to send images to a central location and then manage them using conventional digital image storage and printing technology as described in, for instance, U.S. Pat. No. 6,332,146 issued to Jebens, et al. on Dec. 18, 2001, titled "Method and apparatus for storing and printing digital images", the contents of which are hereby incorporated by reference.

An alternative way to manage and view images taken using cell phones has been provided by companies, such as dotPhoto Inc., of West Trenton, N.J., in the form of central storage servers. Viewers may send their images from the cell phone to the central server, where it is stored in a user album. The user may then access their account at the dotPhoto web-site. This allows the authorized user to view the images stored in their albums and also to order prints of images. The prints of the images are then sent to the user by mail.

A draw back of such existing methods of handling printing or other viewing of digital images taken with a cell phone, is that the user must access a web-site or computer after the pictures have been sent from the camera. What is needed is a method which overcomes these drawbacks.

SUMMARY OF THE INVENTION

Briefly described, the invention provides a method and apparatus for controlling the distribution, including printing, of digital images using a digital cellular phone, or other digital imaging device.

In a preferred embodiment, the digital imaging device is a cellular phone equipped with a digital camera. A picture created using the digital camera is uploaded to a remote server as, for instance, an e-mail attachment via a wireless network accessible by the cellular phone. Arrival of the email containing the digital image activates the automatic printing and automatic delivery of that image, according to instructions placed on the server by the user creating the digital image, prior to the creation of the image.

In a preferred embodiment, the image is sent to a web-site as an email or instant message, or as an attachment thereof. The web-site server uses information in the message, such as the sender email address, to route and process the uploaded image. In a preferred embodiment, each user has a set of predetermined preferences, which may be a default set and which may be altered by the user accessing their account on the web-site. For instance, by the single action of sending a digital image as part of an email to a specific web address from an identifiable cellular phone, a user may cause the image to be stored, printed and delivered as a print to an address, with the printing and mail delivery being automatically charged to an account or credit card.

In a preferred embodiment, the users settings may also allow images to be stored in a queue until a predetermined number have accumulated, so that the printing and delivery of the pictures may be batched to save both printing and deliver costs.

An objective of the design is to simplify digital photography, particularly the viewing and obtaining prints of images taken with cellular phones.

These and other features of the invention will be more fully understood by references to the following drawings.

DETAILED DESCRIPTION

The present invention relates to distribution of images taken using cellular phones, and particularly to the automatic ordering of printing and delivery of printed images.

Cellular phones have become equipped with digital cameras. A camera may also have a wireless connection conforming to well-known wireless communications protocols such as, but not limited to, the Bluetooth wireless protocol or the IEEE 802.11a/b/g wireless protocol (also known as the WiFi wireless). Such devices make taking photographs easy. They, however, create problems as how best to store, view and particularly print copies of the digital image for viewing.

The present invention provides a method for automatically sending images taken on such devices to a server for automatic printing and sending to the user. For instance, in a preferred embodiment of the invention, the single action of sending a digital image as part of an email to a specific web address from an identifiable cellular phone, may cause the image to be stored, printed and delivered as a print to an address, with the printing and mail delivery being automatically charged to an account or credit card.

The invention will now be described in more detail by reference to the accompanying drawings in which like numbers represent like elements.

Figure 1:
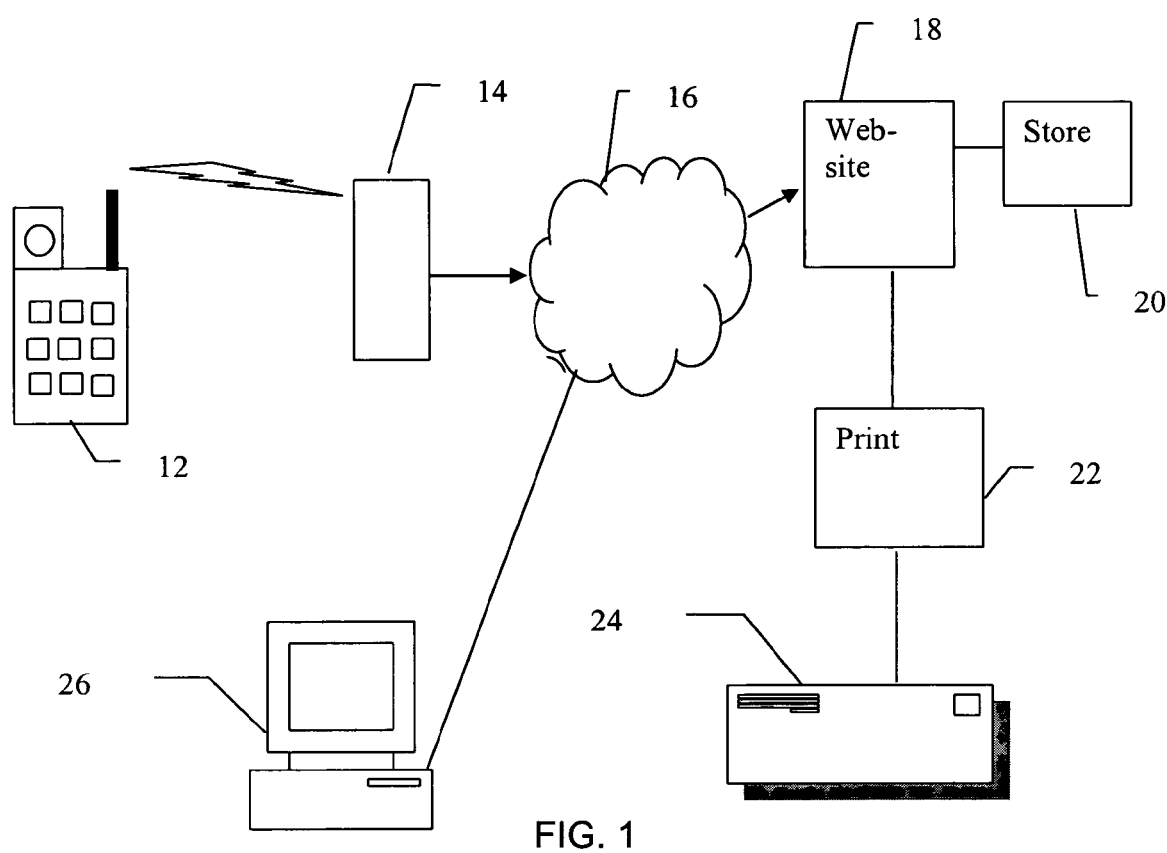
FIG. 1 is a schematic drawing of an exemplary embodiment of the invention.

FIG. 1 is a schematic drawing of an exemplary embodiment of the present invention, comprising a combination cellular phone and camera 12, a cellular relay station 14, a network 16, a central server hosting a web-site 18, a digital storage medium 20, a printing facility 22, a mail item 24 and a computer terminal 26.

Combination cellular phone and camera may for instance be, but is not limited to a Nokia 3650 Tri-band world phone made by the Nokia of Helsinki, Finland, capable of video capture and playback, still imaging, multimedia messaging, operating on Java™ MIDP 1.0, having Bluetooth networking capability, a relatively large color display and polyphonic ringing tones. After an image is taken using the combination phone and camera 12, the image may be uploaded as part of an e-mail using the cellular phone. The e-mail is relayed via a cellular relay station 14 to a network 16 to a server operating a web-site 18. Network 16 may for instance be the Internet, or any other suitable network. The web-site on server 18, may include provision for users to have accounts, including provision to store image on digital storage medium 20. The server operating the web-site 18 is also connected to a printing facility 22, which may include the capability to produce print versions of images, including high quality color prints. Print facility 22 may also have a capability to package prints and address them in the form of a labeled letter or package 24, suitable for mailing.

Figure 2:
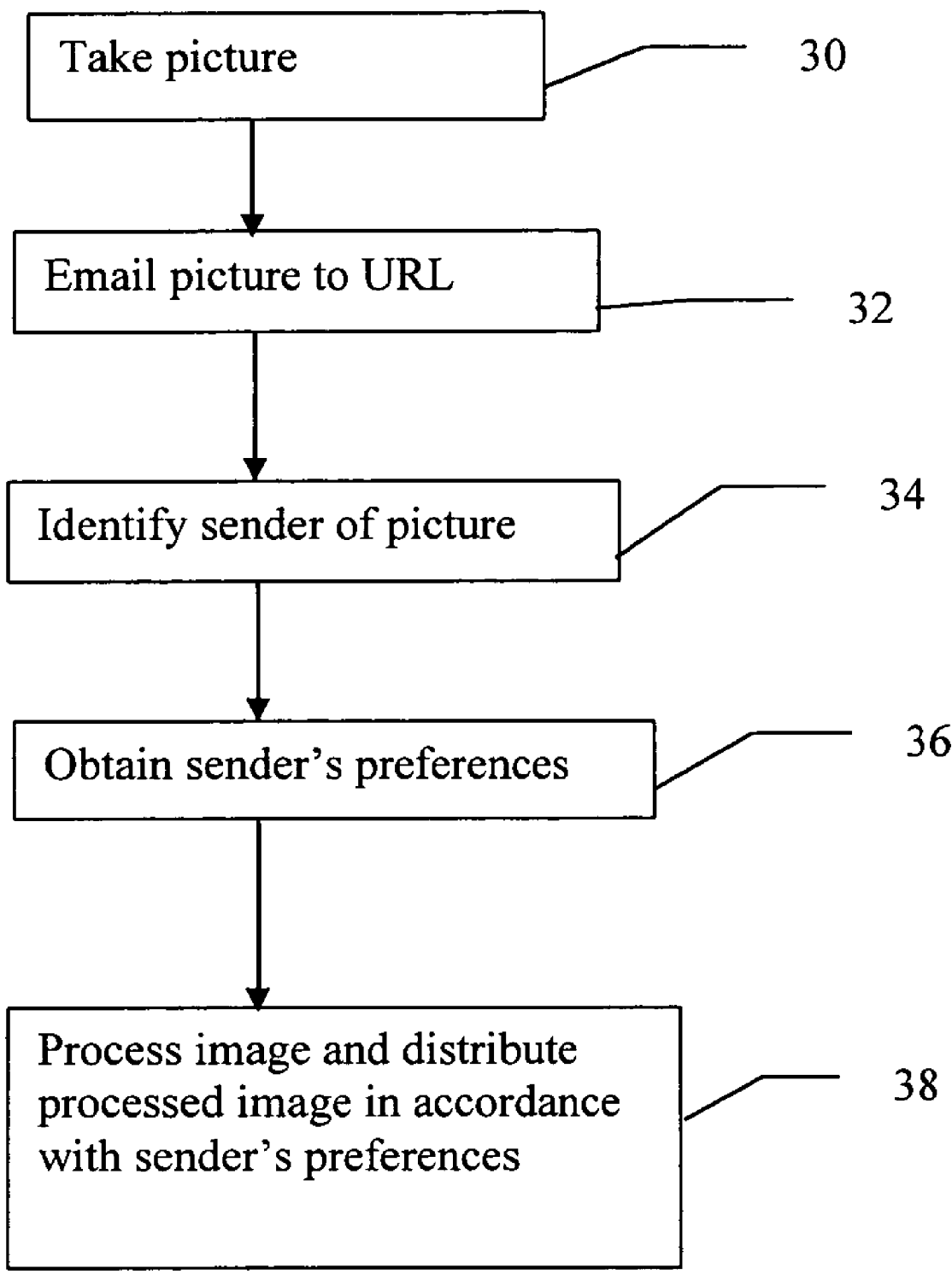
FIG. 2 is a schematic flow chart illustrating a preferred embodiment of the present invention.

FIG. 2 is a schematic flow chart illustrating a preferred embodiment of the present invention, comprising the steps of taking a picture 20, of emailing the picture to a URL 32, of the server identifying the sender of the picture 34, of the server using the sender's identity to obtain a sender's preferences 36 and the step of processing the image and distributing the processed image in accordance with the sender's preferences.

In a preferred embodiment, step 30 of taking a picture comprises taking a digital photograph using a camera that includes or is directly connected to an internet access device, such as a combination cellular phone and digital camera.

In a preferred embodiment step 32 of sending the picture to a Uniform Resource Locator (URL) comprises sending the digital image as part of an e-mail or instant message to a web-site identified by the URL. The URL may be a specific address within a web-site, such as auto-image-proccess@proccess.com, that allows the web-server to route the incoming image in a specific way. In the preferred embodiment, messages sent to the specified address are processed by first identifying the sender of the image in step 34. This may, for instance, be done by means of the senders email address or other information in the message including, but not limited to any messages in the subject or body of the message. In a further embodiment of the invention, the identification may include camera identification attached to the email or embedded in the image itself. In a further embodiment the step of identifying the sender 34 may include authentication of the sender by, for instance, using a password in the subject line of the message.

In step 36, the server uses the sender's identity to obtain the sender's preferences. These preferences may include, but are not limited to, how many images the user wishes to queue before batching to printing, how the user wishes to pay, what type of printing the user would like, where the printed images or objects are to be sent and how the user would like to be notified that image has been received and/or processed. These preferences may have default values or they may be previously set by the user on activating the account or on updating their account.

Image queue options may include storing a pre-set number such as 36, and sending as a batch when ever that number is reached. There may also be a window of time, such as 2 hours, so that any images over the required target that are uploaded within a preset time after the target is reached, are also included in the batch. The target may also be a time limit such as, but not limited to, batching whatever images are in a queue at the end of each day, or week or month or any other convenient time limit.

Payment options may include a choice of credit cards, billing by account, electronic payment by, for instance Paypal, by coupon, or any other form of online payment.

The type of printing may include options such as number of copies, color or black and white, paper quality, size, matt or glossy. In further embodiments, type of printing may also include printing on objects such as, but not limited to, tee-shirts, caps, mugs or other objects or gift items such as calendars and cards. Type of printing may also include packaging of the printing such as, but not limited to, placing the print in a frame or adding appropriate covering, such as a glass cover to a framed print.

Sending options may include an address to be sent to, or a group of address and mailing options such as express, overnight, second day delivery.

In step 38, the server sets in motion processing the image according to the users current options, and then distributing the processed images in accordance with the users instructions.

Notification options may include voice-messages on the cellular phone, e-mail messages, text messages to a cellular phone or other suitable form of knowing how the status of the process, including regular updates on the number of images in the queue.

In a preferred embodiment, the user may also send text or email messages with instructions to update, modify or temporarily over-ride the users current options. These messages may accompany an uploaded image or may be sent separately. For instance, the user may email a message in which the subject line reads "Print Now", and the server would then immediately send all images currently in the users queue to be printed and sent to the users home address or otherwise dealt with in accordance with the users other preferences. All aspects of the processing and distribution of the users images may be altered by suitable commands sent from the users uploading device, which may be a cellular phone, including all storing, queuing, billing, printing and mailing options. For instance, MAIL_TO_ALLWAYS "New address", in the subject or body of an email to the appropriate URL may result in the prints now always being mailed to the new address.

The user may also specify which of several albums in their account the images should be stored, by preset preferences or by, for instance, adding an album name in the subject or body of an e-mail or text message.

The user may also upload the images to a shared account or album, in a form of "Image" blogging. For instance, a user having an event, such as a wedding or reunion, my set up an account which would allow all attendees of the event to upload copies of the pictures they take at the event to a common site, where they can then be viewed and purchased or selected for printing by all people having access to the site. Access to the site may be via a common identifier entered as a subject such as, but not limited to, something a long the lines of "Brenda's Wedding", or it may be via a pool of pre-identified or pre-registered e-mail addresses corresponding to all the e-mail addresses of the devices of people attending the event. In a further embodiment, the server may use the geographical location of the sending device to allow access to the album. For instance, by using GPS or other locating device built into the cellular phone, the server may identify the exact geographical location of the phone sending the images, and allow and route the image to a specific file. For instance, a wedding album may be accessed for a specific time, such as an hour before the event to an several hours after the reception is scheduled to end, by any cellular phone have the same geographical location (or being within some predefined geographical distance of) the location of the person with the account (who it is assumed will be in attendance at the event).

Although the preferred embodiment requires no special software on a camera/cellular phone, in a further embodiment, an agent may be downloaded onto a phone to facilitate identifying users. This agent may for instance be used to create temporary access or identification for the purpose of uploading images to a joint account, such as the wedding or reunion example above.

In a further embodiment, the user may control the distribution of images taken on a cellular phone in the manner described above, but where the distribution is to, for instance, on or more digital viewing screens instead of, or as well as, via printing.

Figure 3:
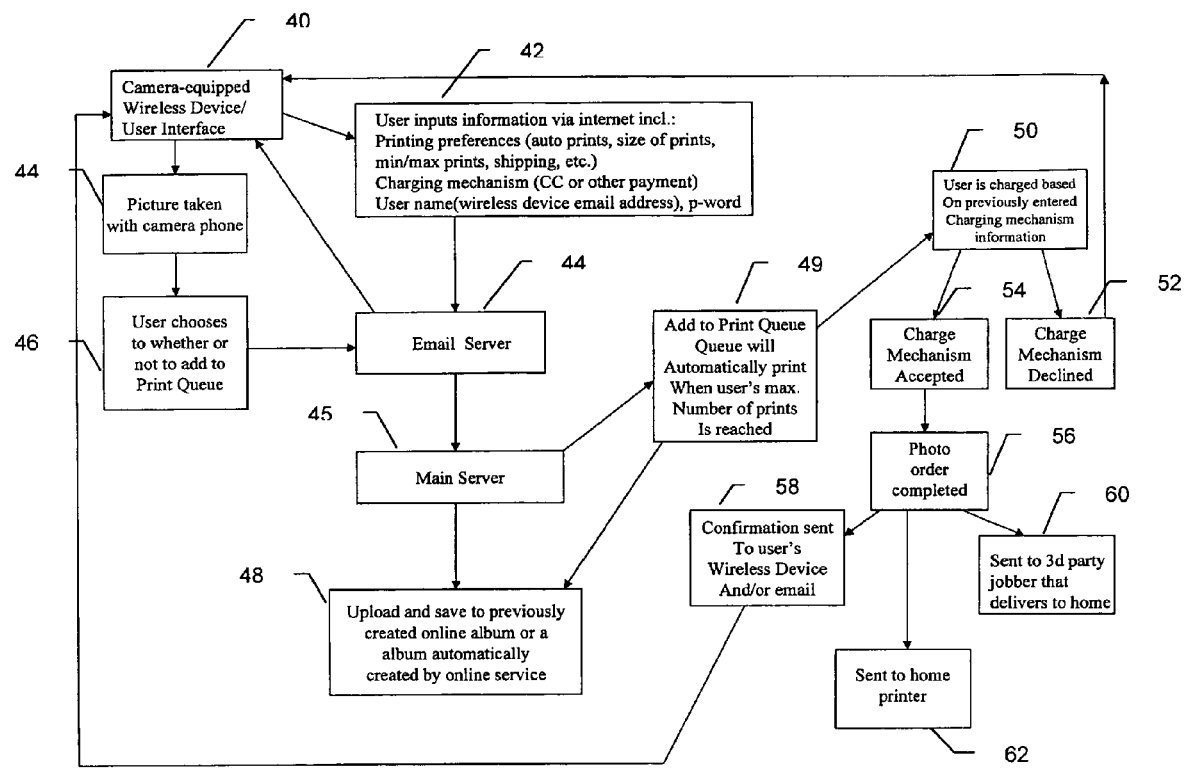
FIG. 3 is a schematic version of a preferred embodiment of the invention.

FIG. 3 shows a schematic version of a preferred embodiment of the invention. The camera-equipped wireless device with suitable user interface 40 may be used to set up and update an account by inputting information in step 42 via the internet. Inputting the information in step 42 is typically done via a web-site running on the main server 45 and may include, but is not limited to, setting up printing preferences by providing instructions such as the size of prints required, the address to which prints are to be sent, the number of prints to store before printing and sending the prints to the required destination, a time or date to wait for until printing and sending prints, the method of shipping, the payment method, a user name and a password.

Having set up the account, subsequent use of the digital imaging device 40 to take a digital image in step 44 will, after user chooses whether or not to add the picture just taken to the print queue, may result in the picture automatically being sent to the email server 44. The email server 44 relays the digital image on to the main server 45.

Depending on the instructions stored on the main sever 45 prior to the creating of the digital image being uploaded, the digital image may be automatically processed in a variety of ways. The digital image may, for instance, be uploaded and saved in step 48, to a previously created online album or an album automatically created for the digital image. The system may additionally, once step 48 of successfully uploading and storing the digital image has been successful, send a confirmation back to the camera equipped wireless device 40, acknowledging the successful storage of a particular digital image so that that digital image can be erased from the devices memory, freeing up space for further images to be taken and temporarily stored on the device. At the same time, or instead, the digital image may be added to a print queue in step 49. The print queue may automatically print the queue when a user specified, predetermined number of images has been stored, or at the end of a certain time. For instance, all the prints in the queue may be printed at the end of a day or the end of a week or the end of a month or the end of a year.

Once the digital images are printed, in step 50, an attempt to charge the cost of the printing and subsequent sending of the print to the user specified address, may be made. If in step 52, the attempt to change an account is declined, the user may be notified directly. If, in step 54, the charge mechanism accepts the charge of the cost of printing and sending, the photo order is completed in step 56. Completion of the order may include, but is not limited to, automatically packaging, automatically labeling and automatically placing the package at a collection point for collection and conveyance by a mail service operator, which may be a $3^{rd}$ party jobber, that delivers the package to the address specified by the user which may, for instance, be the home address of the user. In addition, or instead, completion of the order may include sending the digital image to the user's home printer for printing in step 62. Completing the order may also include step 58 of sending a confirmation to the user by, for instance, an email, an instant message or a voice mail sent to the wireless device in step 58.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the invention.

What is claimed:

1. A method of automatically printing digital images, comprising the steps of:
   creating, by a user, at least one digital image using a digital imaging device;
   uploading, by said user, said at least one digital image from said digital imaging device via a wireless link to a server remote to said digital imaging device;
   automatically storing at least one digital image in an image store responsive to at least one instruction loaded on said server;
   automatically-printing said at least one digital image responsive to at least one instruction stored via a web-site on said server by said user prior to said creating said digital image;
   automatically sending said at least one printed image to a destination remote to said server corresponding to at least one address stored via said web-site on said server by said user prior to said creating said digital image; and
   wherein said instructions comprise waiting to proceed with said automatically printing and said automatically sending until said image store contains a predetermined plurality of images, said predetermined plurality being selected on said server by said user prior to said creating said digital image.

2. The method of claim 1 further comprising the step of automatically charging a cost to an account for said printing and said sending of said printed image, at least one detail of said account having been stored on said server by said user prior to said uploading.

3. The method of claim 1 further comprising sending a print-all instruction from said digital imaging device to said server, said instruction causing said automatically printing and said automatically sending of said images currently stored in said image store.

4. The method of claim 1 wherein said digital imaging device comprises a cellular phone equipped with a camera, and wherein said automatically sending comprises automatically packaging, automatically labeling with said address and automatically placing at a collection point for collection and conveyance by a mail service operator to said destination.

5. The method of claim 1, wherein said printing is performed by a printer linked to said server.

6. The method of claim 1, wherein said server transmits said at least one digital image remotely for printing.

7. The method of claim 1 wherein said uploading further comprises identifying said user by said remote server.

8. The method of claim 7 wherein said identifying comprises recognizing one or more of a password, an e-mail address or a current geographical location of said digital imaging device.

9. The method of claim 8 wherein said digital imaging device comprises a cellular phone equipped with a camera, and wherein said automatically sending comprises automatically packaging, automatically labeling with said address and automatically placing at a collection point for collection and conveyance by a mail service operator to said destination.

10. A method of automatically printing digital images, comprising the steps of:

creating, by a user, at least one digital image using a digital imaging device;

uploading, by said user, said at least one digital image from said digital imaging device via a wireless link to a server remote to said digital imaging device; and automatically storing at least one digital image in an image store responsive to at least one instruction loaded on said server;

automatically printing said at least one digital image responsive to at least one instruction stored via a web-site on said server by said user prior to said creating said digital image;

automatically sending said at least one printed image to a destination remote to said server and corresponding to at least one address stored via said web-site on said server by said user prior to said creating said digital image; and wherein said instructions comprise waiting to proceed with said automatically printing and said automatically sending until a predetermined time specified on said server by said user prior to said creating said digital image.

11. The system of claim 10, wherein said printing is performed by a printer linked to said server.

12. The system of claim 10, wherein said server transmits said at least one digital image remotely for printing.

13. The method of claim 10 wherein said digital imaging device comprises a cellular phone equipped with a camera.

14. The method of claim 13 further comprising sending a print-now instruction from said cell phone to said server instructing proceeding with said automatically printing and said automatically sending of said images currently in said image store.

15. A system for automatically printing digital images, comprising:

digital imaging means for creating, by a user, at least one digital image;

uploading means, functionally connected to said digital imaging means, for uploading, by said user, said at least one digital image from said digital imaging device via a wireless link to a server remote to said digital imaging device;

means for automatically storing images in an image store;

means, responsive to at least one instruction stored via a web-site on said server by said user prior to said creating said image, for automatically printing said at least one digital image;

means for automatically sending said at least one printed image to a destination remote to said server and corresponding to at least one address stored via said web-site on said server by said user prior to said creating said image; and means for waiting to proceed with said automatically printing and said automatically sending until said image store contains a predetermined plurality of images, said predetermined plurality selected on said server by said user prior to said creating said digital image.

16. The system of claim 15 further comprising means for sending a print-all instruction from said digital imaging device to said server, said instruction causing said means for automatically printing to print said images currently stored in said image store; and said means for automatically sending to send said printed images.

17. The system of claim 16 wherein said means for digital imaging device comprises a cellular phone equipped with a camera, and wherein said means for automatically sending comprises means for automatically packaging, means for automatically labeling with said address and means for automatically placing at a collection point for collection and conveyance by a mail service operator to said destination.

* * * * *